United States Patent [19]

Voight

[11] 4,453,206

[45] Jun. 5, 1984

[54] SWITCHING-MODE POWER SUPPLY REGULATOR

[76] Inventor: William C. Voight, 1970 Harrison St., San Francisco, Calif. 94103

[21] Appl. No.: 330,616

[22] Filed: Dec. 14, 1981

[51] Int. Cl.³ .......................................... H02M 3/335
[52] U.S. Cl. ........................................ 363/21; 363/97
[58] Field of Search ................................. 363/18–21, 363/97

[56] References Cited

U.S. PATENT DOCUMENTS

| | | | |
|---|---|---|---|
| 3,514,688 | 5/1970 | Martin | 363/20 X |
| 3,523,235 | 8/1970 | Schaefer | 363/19 |
| 4,301,497 | 11/1981 | Johari | 363/21 |
| 4,347,559 | 8/1982 | Sturgeon | 363/21 |
| 4,355,277 | 10/1982 | Davis et al. | 363/21 X |

OTHER PUBLICATIONS

IBM Technical Disclosure Bulletin, "Power Supply with Optical Isolator", A. J. Bowen, G. M. Heiling, L. T. Lemke, vol. 14, No. 11, Apr. 1972.
IBM Technical Disclosure Bulletin, "Flyback Converter System", R. P. Rizzo, vol. 23, No. 8, Jan. 1981.

Primary Examiner—William M. Shoop
Attorney, Agent, or Firm—Michael L. Harrison

[57] ABSTRACT

A regulator for a blocking oscillator includes overcurrent protection and light-load operation. An error signal derived from sensing output voltages is then summed with an opposite sense ramp voltage at the input of a comparator having a high amount of hysterises. When sufficient ramp voltage is generated to cause the comparator to switch, a pulse is generated to cause the main power switch to turn off. Variations of the error voltage thus causes the ramp time to vary in a way which opposes changes in the voltage at the load.

5 Claims, 2 Drawing Figures

SWITCHING-MODE POWER SUPPLY REGULATOR

BACKGROUND OF THE INVENTION

1. Field of the Invention

The present invention and the invention described in co-pending application Ser. No. 332,449, filed on Dec. 21, 1981, relate to the field of electronic, switching-mode power supplies and, in particular, to regulator circuits for electronic switching-mode power supplies employing blocking oscillators.

2. Prior Art

The use of switching elements in electronic power supplies is well known in the present state of the art. The advantages of such power supplies include higher efficiency, lower weight and smaller size in comparison to analog power supplies. At some power levels, switching-mode power supplies are even less costly than their analog counterparts.

The size and weight advantages of switching-mode power supplies are achieved by operating their transformers and other magnetic components at high frequencies. In a conventional power supply, the transformer is operated directly from the main power source and, accordingly, is operated at the frequency of the power source.

The size advantages of commercial switching-mode power supplies result from the operation of the power transformers at a frequency well above that of standard power line frequencies. In fact, it is usually well into the high audio frequency or ultrasonic frequency range. Dramatic miniaturization is thus achieved, albeit at the expense of somewhat greater circuit complexity.

For the same power levels, a conventional transformer will vary in size approximately inversely with frequency. As frequencies become higher and higher, cores having suitable core loss characteristics cause the relationship to become less favorable since the so-called "low-loss" materials may have low maximum flux density capabilities. Thus, the core size itself will be larger than would be predicted if a change in core material was not required. Nonetheless, transformers having extraordinarily high volt-amp ratings per unit volume, are made possible by operation at the high frequencies possible with switching-mode circuitry.

Because the switching-mode power supply is lightweight and has such superior compactness, it has become more and more the design of choice for small, semi-portable equipment. In fact, the use of switching-mode supplies is now being seen in applications which were once thought to be the exclusive domain of analog supplies such as in small digital computers, in particular those intended for small business applications, where compactness is considered an important attribute for ease of installation in an office environment.

The conventional approach to design of switching-mode power supplies has been to employ a magnetically-coupled multivibrator which uses a pair of high-efficiency, solid-state switches, each alternately switching one-half of a center-tapped transformer primary to cause a square-wave having peak voltage equal to twice the center-tap voltage to appear across the entire primary. On alternate half-cycles, the primary current flows first in one side of the primary through the switch which is on, then through the other side of the primary and its associated switch, each for one-half of the period of the supplier basis operating frequency.

The search for cost-effective ways to achieve a regulated switching-mode power supply has led to the adoption in recent years of the blocking oscillator and its variants as the basic power converter design. Although somewhat touchy in terms of start-up and wide load-range operation, the blocking oscillator is a highly efficient circuit both in terms of its power processing efficiency and its parts cost. Instead of a pair of switching transistors and a series-pass transistor as required for a regulated conventional DC-DC converter, the blocking oscillator-based power supply requires but a single switching transistor which can be made to perform the functions of both chopping the unregulated direct current supplied to the input, and regulating the voltage produced at the output.

In addition to the reduction in parts count, the blocking oscillator-based power supply can be rendered in a design which does not require the switching transistors to see twice the input voltage, as does the standard DC-DC converter. Instead the power switch sees a theoretical maximum voltage of significantly less than twice the input voltage, depending upon the duty cycle which is chosen for its operation. Thus, operation of the supply directly from a 220 volt rectified main power source is possible, even using currently available semiconductor devices.

Existing regulator designs for switching mode supplier are deficient in that they do not take account of the idiosyncracies which can occur in the operation of these supplies particularly with regard to overload condition and no-load conditions. Moreover, existing designs are somewhat elaborate for the functions they perform and are therefore not economical to produce.

SUMMARY OF THE INVENTION

Accordingly, it is an object of the present invention to provide an improved regulator circuit for operation with a blocking oscillator based power supply which reliably regulates all output voltages against line and load variations, and which is simple and economical to manufacture.

It is another object of the present invention to provide a blocking oscillator based power supply regulator which has current foldback under overload fault conditions.

Briefly, the present invention accomplishes these and other objects by providing an error amplifier which senses the output voltage of the supplies and compares it with a standard reference voltage. The error signal is then summed with an opposite signal ramp voltage whose magnitude is proportional to the volt-sec/turn impressed on the transformer windings at the input of a comparator which has hysteresis. Generation of the ramp is initiated by a pulse derived from the power transformer secondary and is in synchronism with the waveform of the main power switch. When sufficient ramp voltage is generated to cause the comparator to switch, a pulse is generated to cause the main power switch to turn off. Variation of the error voltage thus causes the ramp time to vary in a way which opposes changes in the voltage at the load, thereby regulating the voltage which is delivered to the load.

DESCRIPTION OF THE PREFERRED EMBODIMENT

General Description

Figure 1:
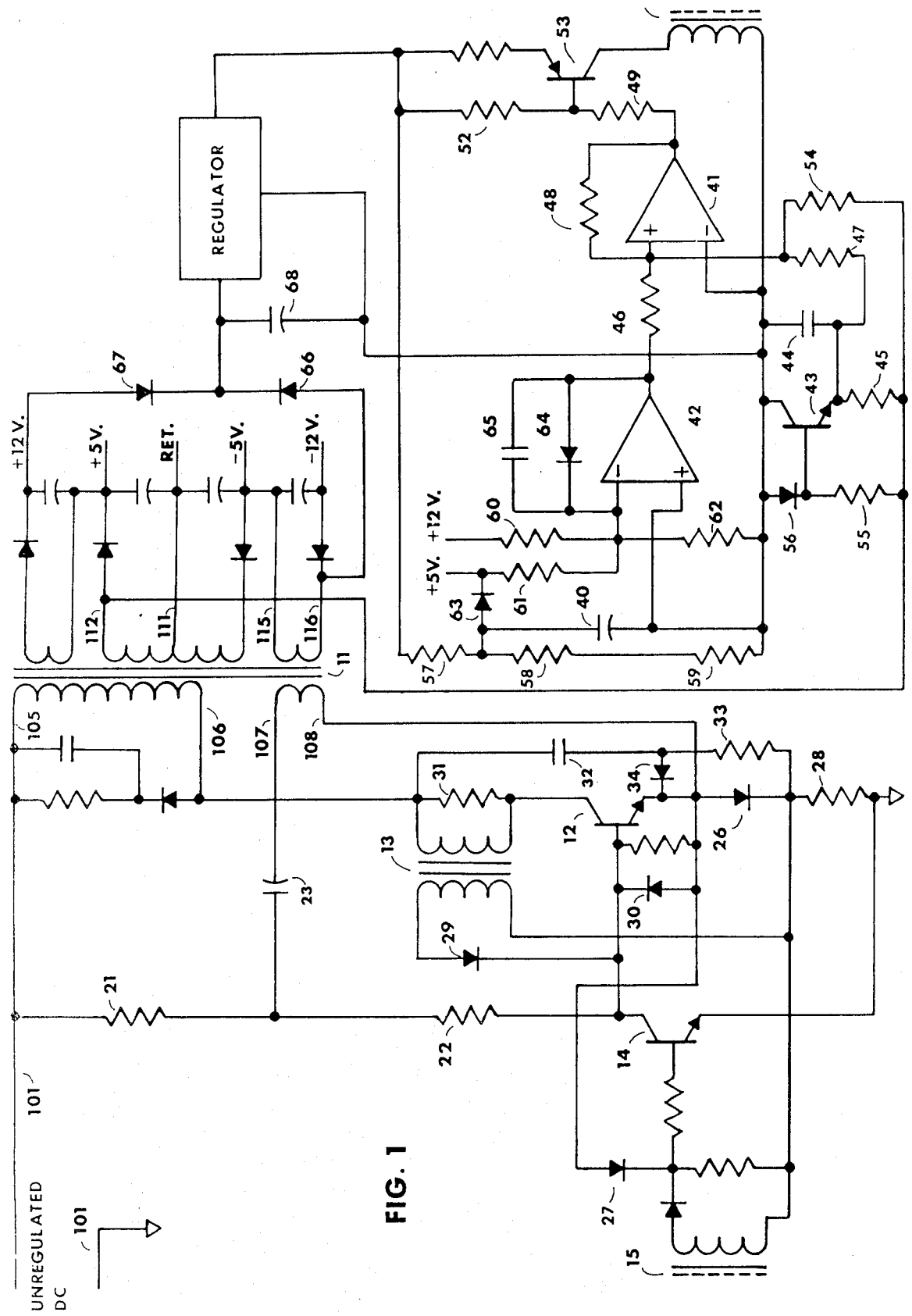
FIG. 1 is a simplified schematic diagram of a blocking oscillator based power supply in accordance with the present invention in which the primary regulator circuitry is shown in detail.

Referring now to FIG. 1 there is shown a blocking oscillator-based, switching-mode power supply in accordance with the present invention. Unregulated direct current from an external source is presented to the inputs of the power supply at 101 and 102. In a frequently employed embodiment, the direct current needed for operation of the supply and for processing for delivery to the load is provided by direct rectification and filtering of an AC main.

Current from the unregulated source is caused to flow through transformer 11 by means of alternately switching the solid state switch, transistor 12, ON and OFF.

Current builds in the primary inductance of transformer 11 until transistor 12 is turned "OFF". Upon turn-off, a path for primary current flows ceases causing the magnetic field produced by the primary to collapse, in turn causing a voltage opposite in sign to that originally impressed on the primary to appear across the primary coil. The phasing of secondary windings, and the polarity of secondary rectifiers is chosen so that conduction in the secondary circuitry occurs only during the flyback time of the primary waveform. Thus, energy is stored in transformer 11's primary during the ON-time of transistor 12 and is transformed into the secondary of transformer 11 during the OFF-time of transistor 12.

Since the primary current increases linearly with time elapsed since the beginning of the cycle, control of the ON-time of transistor 12 controls the value of the peak current to which the primary current is allowed to build. ON-time of, and therefore peak current through, transistor 12 is controlled by transistor 14 which is in turn controlled by transformer 15 and the regulator ON-time current circuitry 3. Control of ON-time current and therefore peak current is provided in response to the output of reference amplifier 17 which is in turn responsive to the differential between a sample of the output voltage and a reference voltage presented to the comparator at inputs 111 and 112 respectively.

In most general terms, an increase in voltage at the load 20 results in an output from reference amplifier 17 which causes the ON-time control circuitry 3 to produce a pulse which is coupled through transformer 15 to transistor 14 and which in turn cuts off base drive to transistor 12. A reduction in load voltage causes the base drive to transistor 12 to be allowed to remain on for a longer period of time. Since the ON-time of transistor 12 controls the amount of energy stored in the primary inductance of transformer 11, it follows that the amount of such energy stored during each cycle is controlled by controlling the ON-time of transistor 12 in response to the output of reference amplifier 17.

Thus, by proportionately increasing or decreasing ON-time, in response to changes in the voltage appearing across load 20, it may be seen that the circuit regulates the output voltage, maintaining it within pre-established values. Since the main transformer 11 isolates the load from the line voltage, and since transformer 15 isolates the control feedback loop from the load, it may also be seen that the load can be referenced to any convenient point without regard for the reference of the input, and that the feedback loop nonetheless operates effectively around the power transformer 11. This allows operation of the power supply directly from a main power source without need for an intervening, bulky, line-frequency isolation transformer, since isolation of source and load is achieved by means of the high-frequency transformers 11 and 15.

Detailed Description of Operation

The circuit of FIG. 1 may now be evaluated in more detail with emphasis upon the features which comprise the present invention. Under initial start-up conditions, base drive is zero to both transistors 12 and 14, and current is not flowing through the collector circuit of either transistor. Unregulated direct current is applied to inputs 101 and 102, which initially causes current to flow in resistor 21, through resistor 22. The current flow through resistor 21 is initially into capacitor 23 which charges through winding 107/108 through diode 26 and resistor 28 until the voltage on the capacitor equals the threshold voltage of the base of transistor 12. At that point, current is diverted into the base and charge increase on capacitor 23 is stopped leaving a slight, approximately 0.7 V. charge on the capacitor. Resistor 21 is much higher in value than resistor 22 so that once circuit operation is established in steady state conditions, its effect is minimal.

The small initial current flow into the base of transistor 12 causes a higher magnitude current to begin to flow in the collector circuit of transistor 12 and through the primary windings 105/106 of transformer 11. As flux builds up in the core of the transformer, voltage is induced in a secondary winding 107/108 causing capacitor 23 to be charged in a reverse direction through the current loop consisting of resistor 22 and the base of transistor 12.

Since the current flowing into the base due to charging of capacitor 23 is in phase with the current provided by resistor 22, further conduction is possible through the collector circuit of transistor 12. Further increases in collector current in turn cause corresponding increases in the current through capacitor 23, which itself in turn regeneratively increases the conduction through the collector. When sufficient base current is provided to drive the collector of transistor 12 into saturation, the full available supply voltage is impressed across the primary winding of transformer 11 causing the full value of the secondary voltage of winding 107/108 to appear at capacitor 23. Capacitor 23 thus discharges through resistor 21 and the base of transistor 12 according to the time constant of the circuit, with an allowance being made for base-emitter voltage drop at transistor 12, a factor which is slightly influenced by the base current supplied from the proportional base drive circuitry described below.

When steady-state conditions are established, each cycle's drive is initiated on a cycle by cycle basis through the action of winding 107/108, coupled through capacitor 23. Following the flyback time when the magnetic field stored in the primary of transformer 11 has collapsed to the point at which the secondary rectifiers have ceased conduction, the primary voltage drops to zero and continues negatively due to the transformer leakage inductance, thereby again inducing a base-drive voltage at winding 107/108 which again drives transistor 12 into conduction thereby repeating the cycle.

During the ON portion of each cycle of operation, transistor 12 provides a path through which current can flow in the primary of transformer 12 as described above. The voltage impressed across the primary causes the current to increase in the primary of transformer 11 linearly at a rate determined by the value of the impressed voltage and the value of the primary inductance. The level to which the current is allowed to increase is determined by the ON-time of transistor 12, which in turn is determined by the ON-time control circuitry in response to the sensed load requirements.

Regulation of the secondary output voltage is obtained by adjusting the level of the peak to which the current is allowed to build in the primary of transformer 11, by the expedient of reducing the ON time for transistor 12.

The energy which is temporarily stored in the primary of transformer 11 is proportional to the square of the current at any given time. The peak energy is therefore proportional to the square of the current at its peak. However, the current value itself increases linearly with respect to time from a value of zero, at the time of initial turn-on of the transistor 12, to its peak.

Since the flux linkages around transformer 11 are, in theory, constant, the volt-second integrals for the pulse waveform during the transistor 12 ON time, and the pulse waveform for the OFF time are equivalent, although opposite in sign. Thus, when the ON time of transistor 12 is reduced, the OFF time is reduced by a proportional amount. However, as noted above, the energy stored in the transformer for each pulse is proportional to the square of the peak current. Therefore, even though the value of the volt-second integrals must remain equal regardless of the operating frequency, the energy stored per pulse varies as the square of the ON time period thereby effecting overall a reduction in the rate of storage and dissipation of energy, i.e. the power processed through the transformer. The net effect is that as the load requirements change, the ON time of transistor 12 decreases as does the OFF-time by a proportional amount. This causes an increase in the pulse repetition rate of the oscillator. However, although the pulses are more frequent, each pulse's energy content is decreased by a ratio which is greater than the proportional increase in the number of pulses. Thus, by regulating the ON time of transistor 12, and indirectly regulating the frequency of the oscillator, the amount of power processed through transformer 11 can be controlled.

As the input line voltage changes, the time required to reach a given peak primary current is proportionally reduced. The ON time is therefore shortened and an increase in operating frequency results. An increase in operating frequency with all other factors remaining constant however, increase the energy flow from primary to secondary, thereby causing an increase in output voltage to the load. Accordingly to maintain a constant output voltage, the ON time must be further still reduced to the point at which the energy flow from primary is balanced by that required in the secondary. This adjustment of ON-time occurs automatically and smoothly by operation of the regulator circuitry.

Current Limiter

Diodes 26 and 27, and resistor 28, comprise the elements of a simple current-limiting circuit which prevents excessive collector current and excessive power dissipation in transistor 12 during initial turn-on inrush, or due to load faults. Current through transistor 12 is sensed by voltage drop across resistor 28. Resistor 28 is chosen to have a low value of resistance so that the voltage dropped across the resistor is a small percentage of the primary voltage. The emitter of transistor 14 is referred to the low potential side of resistor 28 to provide the lowest available potential into which base current may be directed.

Current flow through resistor 28 causes a voltage drop to appear across the resistor. The base of transistor 14 cannot be attached directly to the top of the current sense resistor since to do so would prevent turn-off pulses from transformer 15 being effective. Thus, diode 27 is employed to couple the current sense voltage to the base of transistor 14, thereby providing isolation of the current sense and turn-off pulse circuitry except when over-current conditions occur. Diode 26 serves as a low, fixed-voltage bias source to offset the voltage drop across diode 27. Since the diodes are of similar material, approximate temperature compensation is also effected by this arrangement.

During overcurrent conditions, the voltage developed across current sense resistor 28 increases to the point that the base-emitter threshold voltage of transistor 14 is exceeded, causing base current to flow into the base of transistor 14. When base current of sufficient amplitude is flowing, the collector of transistor 14 sinks a portion of the current which flows through the junction of the collector of transistor 14 and the base of transistor 12, thereby diverting base drive away from the main power switch, transistor 12.

As transistor 12 pulls out of saturation, collector current is diverted into capacitor 32 which continues current flow through the current sense resistor 28 insuring that base current continues to be diverted away from transistor 12 through transistor 14. Simultaneously the loss of current flow through transistor 12 reduces the base drive available through the proportional base drive circuitry, thereby causing the turn-off to proceed regeneratively. To a lesser degree, turn-off is also assisted by the regenerative coupling through transformer windings 107/108 of transformer 11.

Description of Regulator Operation

Referring still to FIG. 1, on the secondary side, enclosed within the dotted lines in the figure is shown a schematic diagram of a regulator embodying the principles of the present invention.

Error amplifier 42 receives inputs from a reference voltage source which is derived from the stabilized B+ bus through a voltage divider comprised of resistors 57, 58 and 59. Suitable adjustments are made possible by adjustment of resistor 59 so that the reference voltage can establish precisely the desired output voltage from the supplies. The reference voltage is applied to the non-inverting input of error amplifier 42. A second input to the error amplifier 42 is derived by sensing the outputs of the supplies, namely the +12 volt and +5 volt buses an combining the two through a voltage divider comprised of resistors 60, 61 and 62. In effect, the inverting input of error amplifier 42 sees an average sense voltage based upon sensing both 12 volt and 5 volt supplies simultaneously.

Comparator 41 receives inputs from error amplifier 42 combined with the output of the ramp generator consisting of transistor 43 capacitor 44 and resistor 45.

The threshold of comparator 41 is the return bus to which the remainder of the regulator circuitry is referenced. The output of error amplifier 42 is positive under quiescent conditions and, in the absence of a suitable input to the ramp generator, provides a positive voltage to the non-inverting input of comparator 41 by means of resistors 46 and 47. Comparator 41 is preferably given some degree of hysteresis in order to immunize the circuit against noise. Hysteresis is provided by means of the positive feedback to the non-inverting input through resistor 48.

The output of comparator 41 is normally high when the input of the non-inverting input 50 is positive. Thus transistor 53 is biased off by means of resistors 52 and 49. When the non-inverting input of comparator 41 is caused to reach the threshold voltage and go below the threshold voltage the output of comparator 41 is driven to ground causing current to flow from the B+ bus through the base of transistor 53 and toward ground through resistor 49. With current flow in the base of PNP transistor 53, a sharp positive going collector waveform appears across the primary of transformer 54 causing primary current to flow and transforming across the transformer a positive going pulse to the base of transistor 14. Transistor 14 then sinks the base current otherwise flowing into transistor 12 to ground and terminates the ON-time of the main power switch transistor 12 thereby controlling the secondary output voltage as previously described.

Referring now in detail to the ramp generating circuit it may be seen that transistor 43 is for most of the period of oscillation operated as an inverting-mode, low saturation voltage switch. Operation in the inverting mode produces collector to emitter saturation voltages of only milivolts. Thus, when transistor 43 is provided with base current by virtue of a positive waveform at the secondary winding 111/112, transistor 43 provides a low impedence path for discharge of capacitor 44, which discharge can be virtually complete due to the low voltage of the collector to emitter voltage of transistor 43. Thus, each cycle of the ramp generator begins with capacitor 44 discharged to virtually zero volts, assuring an accurate repeatable ramp voltage proportional to the primary current.

Figure 2:
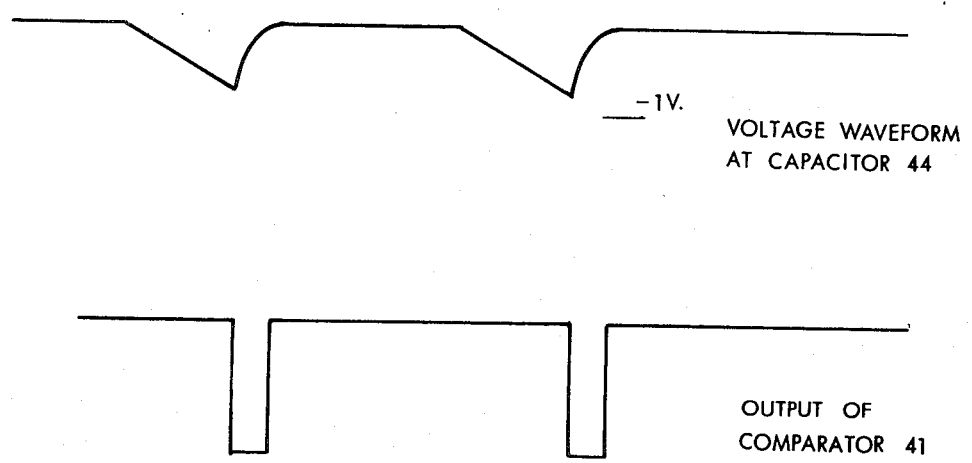
FIG. 2 is a diagram of the current and voltage waveforms of the regulator circuit described in FIG. 1.

Referring now to FIG. 2 there is shown the waveform in a typical operating condition of winding 111/112. The positive going portion of the wave occurs during the time that energy is being dumped from the primary inductance of transformer 11 into the secondary rectifiers and filters. The negative portion of the waveform occurs when the primary power switch transistor 12 is on causing current to build up in the primary of transformer 11. Since it is desired to control the timing of the main power switch, transistor 12, in order to regulate the supply's output, the waveform present at windings 111/112 presents a useful point to derive timing signals for application to the regulator circuitry.

Winding 111/112 initiates the generation of voltage ramp across capacitor 44 as follows. When positive, transistor 43 clamps capacitor 44 to zero volts as described above. When the waveform goes negative, transistor 43 is not conducting being biased off by operation of resistor 55. The negative waveform present at the bottom of resistors 55 and 45 then provides a charging path for charging capacitor 44 negatively. It should be noted that capacitor 44 is required to charge to but a small voltage. In practice the waveform amplitude across capacitor 44 is limited to less than one volt. It should also be noted that for the small amplitude of charge which will be built up on capacitor 44, the voltage on the capacitor is a small percentage of the total voltage impressed across the ramp generator circuitry. Thus, to a very high degree of accuracy, an approximation may be made that the capacitor charges linearly as if charged by a perfect current source, rather than as if charged by a high value resistor in series with a voltage source as is the true case.

It may also be noted that the charging rate for capacitor 44 is directly affected by and is proportional to the amplitude of the negative portion of the waveform, the amplitude of which itself is proportional to the maximum primary voltage impressed across the primary of transformer 11. The primary voltage is in turn a direct function of the line voltage which is applied to the input of the unit. Therefore, as line voltage changes occur, the charging rate across capacitor 44 changes proportionately in a direction which tends to maintain operating conditions around the entire supply in a stable, steady condition.

A small amount of feed forward is provided to the input of the comparator by resistor 54 which to a first approximation renders peak output current independent of live voltage.

It should be noted that the voltage ramp which is produced at capacitor 44 is an exact analog of the current flowing in the primary of transformer 11. Thus, the secondary portion of the regulator commands the primary switch to turn off at a current level which is specified by the error amplifier in order to maintain the outputs of the supply at their design values. Although the primary voltage may fluctuate causing a change in the rate at which the current increases, in the primary of transformer 11 the change is transmitted immediately to the ramp generator which, it will be recalled, is responsive to primary voltage changes since they are coupled directly through winding 111/112, the voltage source from which the ramp current is derived.

In comparison to a conventional regulator which relies upon control of an averaged ON-time, the present regulator design can respond much more rapidly to accommodate changes in load and line voltage.

Current Foldback and Secondary Current Limiter

The primary circuitry of the power supply has a built in current limiter which limits the peak current which can be achieved in the primary of transformer 11 regardless of the status of control signals derived from the secondary. The main current limiting function is provided however by the secondary portion of the regulator.

This function is accomplished by taking advantage of the correlation between ON-time of the pass transistor 12 and the charge on capacitor 44. It will be recalled that the current through the primary series pass transistor 12 increases linearly with time. The charge, and therefore the voltage on capacitor 44 also increases linearly with time. Thus as previously described the voltage on the capacitor is an analog of current in the main power switch, transistor 12, at any given time. Moreover, it is the controlling function for cutting off transistor 12. As a result, limiting the maximum voltage to which capacitor 44 is allowed to charge before transistor 12 is required to turn off has the direct effect of limiting the maximum current to which the primary current can build.

Limitation of the voltage to which capacitor 44 is required to build before the threshold of comparator 41 is reached is in turn limited by placing restraints on the voltage which can be seen at the positive input to the summing network, resistor 46. This is accomplished by providing a clamp diode 64 for the output of error amplifier 42 which constrains its output to a level only slightly more positive than its input. When output voltages fall causing the input to the error amplifier 42 to also fall, the error amplifier 42 initially attempts to demand a longer and longer ON-time for the main power switch, transistor 12. However only a limited additional amount of current can be delivered alone, as the error amplifier output goes high, in the sense required to produce more current, the output is clamped at one diode drop above the input.

If overload conditions increase beyond the point at which current limiting occurs, the current delivered to the load is reduced by a foldback circuit consisting of diode 63 in conjunction with the reference voltage dividers resistor 57, 58 and 59.

To understand the operation of the current foldback scheme it must be realized first that the output of a blocking oscillator having current limiting which is effected by means of a common pass transistor is inherently power limited as to all outputs That is to say the combination of power consumption from all outputs is inherently limited by the total current which can be switched by the main power transistor 12. That current is in turn inherently limited by the operation of the current limiter just described. Therefore, if one output becomes overloaded and is caused to fall in amplitude, all other outputs will be similarly affected. In view of this, it is necessary to sense but one output of the several available to activate the current foldback feature. In the present case, the output of the 5 V. supply is chosen as a convenient voltage to sense, the anode of diode 63 is attached to the midpoint of resistors 57 and 58. The cathode of diode 63 is directly connected to the 5 V. supply output. Under normal quiescent conditions, diode 63 is reverse biased and has no offset upon the operation of the regulator. Under fault conditions however, the voltage of the 5 V, output, and all others as previously explained, will fall. At a point determined by the ratio of the resistors 57 and 58 in the reference voltage divider, diode 63 will begin to conduct causing the voltage applied to the non-inverting input of error amplifier 42 to fall. As the error amplifier output 42 falls, the voltage to which the ramp at capacitor 44 must increase before the comparator 41 switches is also diminished. In effect, the regulator sees a requirement for less and less ON-time of transistor 12. Thus, less and less energy is stored in each cycle in the primary of transformer 11 and less and less energy per pulse is transferred to the secondaries of the transformer.

Since inrush at initial turn-on may cause current demands in excess of the current limit point, it is necessary to provide a slow turn-on of the supply to avoid undefined operating modes caused by the current limiter attempting to operate to prevent supply of the initial inrush requirement. Slow turn-on is accomplished by means of capacitor 40 which causes a slow ramping-up of the reference voltage, thus allowing the inrush charge to be supplied over a sufficiently long time period to avoid peaks which trip the current limit point.

Regulator Operating Current

To provide for satisfactory regulator operation, a source for supply to the regulator circuitry itself must be provided under all operating conditions. This objective is easily met when the supply is operating normally for then the supply outputs themselves provide a satisfactory source. During overload conditions, however, when the supply outputs are overloaded and at sub-normal voltage, the flyback voltage will be held to within a few tenths of a volt of the output itself. The present invention takes advantage of the usually unused portion of the operating cycle to provide for this contingency.

The primary circuit will attempt to continue oscillating and therefore will provide a source for operating the regulator if the proper portion of the waveform is selected to provide regulator operating power. Consider that under normal operating conditions, the ON-time of the primary switch, transistor 12, causes the full line voltage to be impressed across the transformer. Thus, on the secondaries, a higher voltage is present during the ON-time then during flyback. Rectification of this voltage provides a source which will allow regulator operation continuously even when the flyback voltage is clamped virtually to ground.

A network for the derivation of operating power under fault and normal conditions is comprised of diodes 66 and 67 and capacitor 68. Under normal conditions, current is derived from the 12 V. supply output directly. Capacitor 68 provides some additional filtering under normal conditions but is otherwise ineffective.

Under fault conditions, if the 12 V. supply drops below pre-established limits, pulse of somewhat less than 12 V. are coupled through diode 66 from winding 115/116. The opposite polarity is chosen so that the pulse is coupled during the forward current rather than the flyback portion of the cycle.

The two diodes 66 and 67 isolate their respective sources depending upon which is the lower in amplitude. During fault conditions, current pulses through diode 66 are smoothed by capacitor 68.

What is claimed is:
1. A regulated switching mode power supply of the self-oscillating type wherein energy stored in the primary inductance is transferred to the load during the flyback portion of the cycle and wherein the amount of energy stored and delivered during any given cycle is controlled by means of turning on and off a main power switch in the primary circuit at the correct time so that the delivery of power to the load is also controlled, comprising;
    a first transformer having a primary and at least one secondary;
    a main power switch for controlling current flow in the primary;
    control means for controlling the turn-on and turn-off of the main power switch in response to a command signal;
    reference voltage means;
    sensing means for sensing the voltage applied to the load;
    an error signal amplifier having two inputs, one input connected to the sensing means and the other connected to the reference voltage means, the output of which amplifier is proportional to the difference of potential between in the voltage sensing means and the reference voltage means;

a voltage ramp generator for generating a voltage ramp which is initiated at the time that the main power switch is turned on, the instantaneous amplitude of which ramp is proportional to the volt-seconds per turn impressed on the first transformer by turning the main power switch on, and which ramp is reset to its initial value after the main power switch is turned off and before the next time at which the main power switch is turned on;

a summing network having two inputs and a summing point, the first input of which is connected to the error signal amplifier output the second input of which is connected to the ramp generator;

a comparator having an output, a first reference input and a second unknown input, the unknown input being connected to the summing point of the summing network, the output of which comparator changes state producing a pulse whenever the magnitude of the voltage at the unknown input exceeds the magnitude of the reference input voltage;

a second reference voltage which may be zero connected to the reference input of the comparator;

command signal generator means responsive to the output of the comparator for producing a command signal of the proper sense, said command signal generator means connected to the control means whereby the main power switch is turned off in response to the command signal thereby stabilizing the output for given load and line conditions.

2. The apparatus of claim 1 further comprising means for limiting the error signal amplitude presented to the summing network.

3. The apparatus of claim 1 or claim 2 further comprising means for supplying sustaining current to the regulator circuitry under fault conditions which cause the main outputs of the supply to fall.

4. The apparatus of claim 1 further comprising means for reducing the input to the first reference voltage means in relation to the reduction in output voltage of the supply.

5. The apparatus of claim 1 further comprising means for reducing the input to the first reference voltage means in relation to the reduction in output voltage of the supply and means for supplying sustaining current to the regulator circuitry under fault conditions which cause the main outputs of the supply to fall.

* * * * *